United States Patent [19]
Thong

[11] Patent Number: 5,144,571
[45] Date of Patent: Sep. 1, 1992

[54] DIRECT DIGITAL SYNTHESIZER WITH FEEDBACK SHIFT REGISTER

[75] Inventor: Tran Thong, Beaverton, Oreg.
[73] Assignee: Tektronix, Inc., Wilsonville, Oreg.
[21] Appl. No.: 841,784
[22] Filed: Mar. 2, 1992

Related U.S. Application Data

[63] Continuation of Ser. No. 615,768, Nov. 19, 1990, abandoned.

[51] Int. Cl.$^5$ .............................................. G06F 1/02
[52] U.S. Cl. ........................................ 364/721; 328/14
[58] Field of Search .................. 364/718, 721; 328/14

[56] References Cited

U.S. PATENT DOCUMENTS

| | | | |
|---|---|---|---|
| 4,328,554 | 5/1982 | Mantione | 364/721 |
| 4,652,832 | 3/1987 | Jasper | 364/721 X |
| 5,010,506 | 4/1991 | Hrncirik | 364/721 |
| 5,014,231 | 5/1991 | Reinhardt et al. | 364/721 X |
| 5,053,982 | 10/1991 | McCune, Jr. | 364/721 |

*Primary Examiner*—Tan Y. Mai
*Attorney, Agent, or Firm*—Frrancis I. Gray

[57] ABSTRACT

A direct digital synthesizer (DDS) for generating an output periodic waveform from a stored digital waveform has a linear feedback shift register coonfigured as a counter. The linear feedback shift register is clocked by the internal reference clock of the DDS, and a predetermined output of the linear feedback shift register is detected to provide a control signal. The control signal causes the frequency or phase of the output waveform to be changed according to control parameters input to a control logic circuit. The control logic circuit preloads the new parameter vlaues into appropriate frequency/phase registers which are switched to the input of the accumulator in the DDS on the next cycle of the reference clock when the control signal is detected.

3 Claims, 2 Drawing Sheets

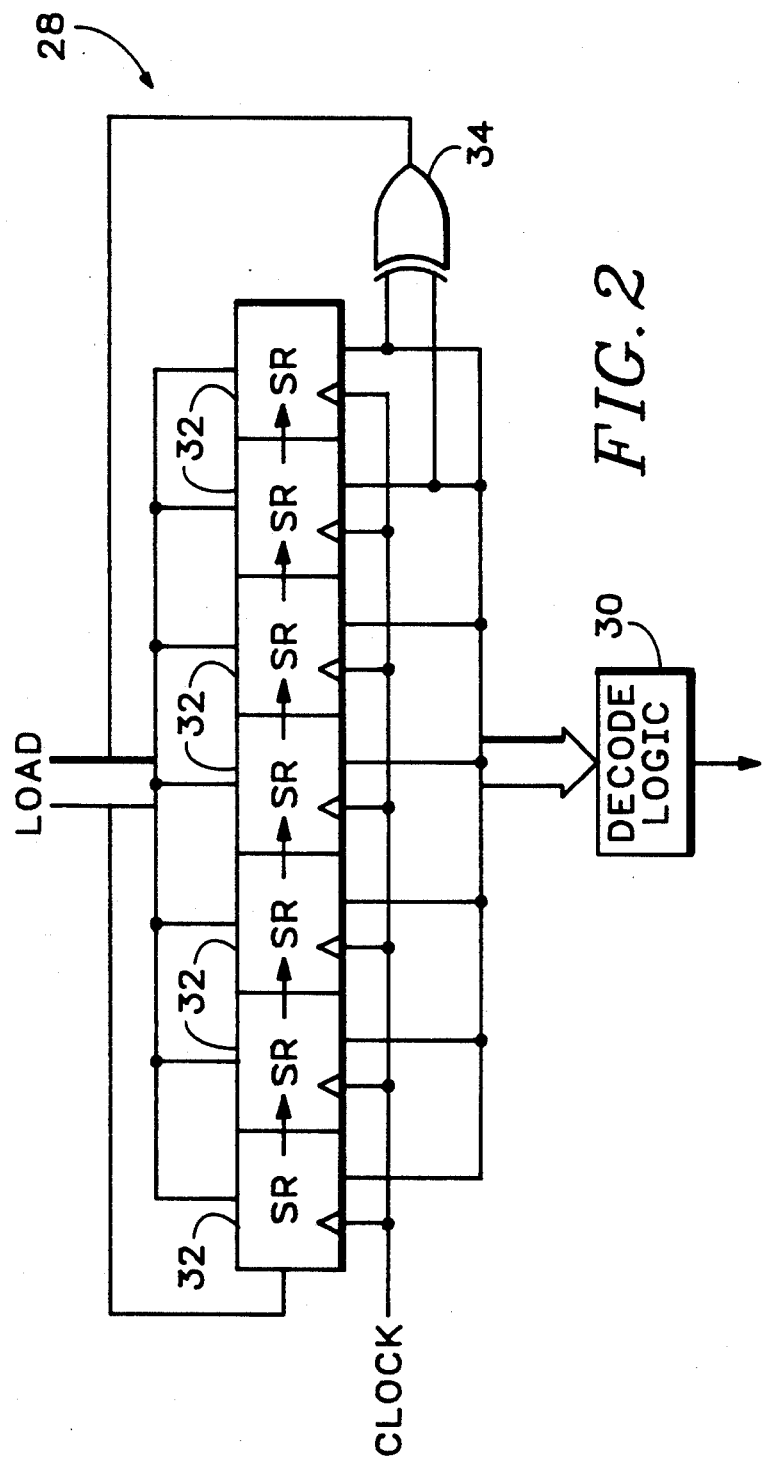

DIRECT DIGITAL SYNTHESIZER WITH FEEDBACK SHIFT REGISTER

BACKGROUND OF THE INVENTION

The present invention relates to periodic signal generators, and more particularly to a direct digital synthesizer (DDS) having a linear feedback shift register configured as a counter to determine when to make frequency/phase changes.

A direct digital synthesizer basically consists of an accumulator that acts as an address generator for a memory. The memory contains a digital representation of a cycle of a desired waveform, such as a sine function. An increment register provides an increment by which the address from the accumulator is changed for each cycle of a reference clock. The larger the increment, the greater the frequency as it requires fewer clock cycles to cycle through the memory, i.e., through one cycle of the desired waveform. The increment may be either an integer or a fraction or combination thereof, with only the integer portion of the resulting accumulation being used as the address for the memory.

For certain types of testing the frequency and/or the phase of the waveform from the DDS needs to be changed. To change the frequency a new value is loaded into the index register so that for each clock cycle the new value is added in the accumulator to produce the addresses for the memory. To change the phase a jump value needs to be added to the accumulator for only one clock cycle without changing the value in the index register. Therefore a switch is provided between the accumulator and the index and jump registers to switch the jump register to the accumulator input for one clock cycle and otherwise switch the index register to the accumulator input.

For very high frequency applications, where the internal DDS clock is at one gigahertz or greater, the external circuitry that runs with the DDS cannot keep up in speed with the internal circuitry. Such external circuitry may run in the 20-50 MHz range, which is considerably slower than the one gigahertz internal clock speed. This speed disparity can result in the missing of reference clock pulses during switching of frequency and particularly phase. The missing clock pulses result in erroneous phase response in the output waveform, i.e., where a 180 degree phase shift at a zero crossing is desired, the phase shift may occur at another instant in time, resulting in distortion of the desired output waveform.

Therefore what is desired is a direct digital synthesizer that can switch at the internal clock speeds so that no clock pulses are missed when changing frequency or phase of the desired waveform.

SUMMARY OF THE INVENTION

Accordingly the present invention provides a direct digital synthesizer (DDS) with a feedback shift register configured as a counter. The feedback shift register is preloaded with an initial count with a logic combination of one or more bits being cycled back to the input of the first stage of the shift register. The outputs of the stages are input to a logic decoder so that when a predetermined condition of the shift register is achieved, a signal is generated that indicates that a change is to be executed. The signal is input to a control logic circuit that, based upon input control parameters, either loads a new frequency into the index register of the DDS or switches a phase jump value to the input of the DDS accumulator for one clock cycle, or both. The control logic circuit loads the next frequency into a preload register and the phase jump into a phase register at a speed unrelated to the internal speed of the DDS. The control logic circuit also loads the shift register with the initial count prior to the next desired frequency/phase change.

The objects, advantages and other novel features of the present invention are apparent from the following detailed specification when read in conjunction with the appended claims and attached drawing.

BRIEF DESCRIPTION OF THE DRAWING

FIG. 2 is a schematic diagram of a linear feedback shift register counter for use with the direct digital synthesizer according to the present invention.

DESCRIPTION OF THE PREFERRED EMBODIMENT

Figure 1:
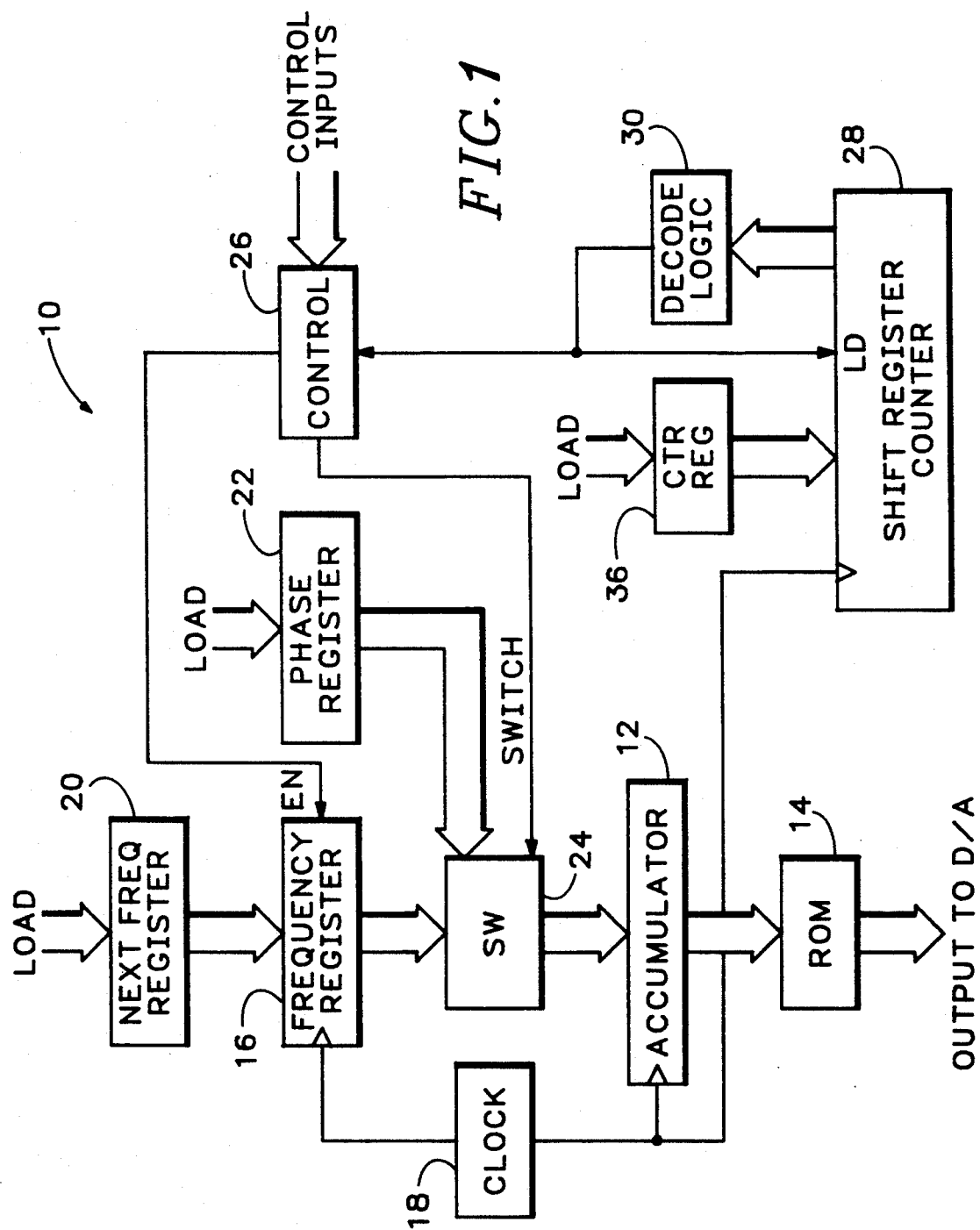
FIG. 1 is a block diagram of a direct digital synthesizer with feedback shift register according to the present invention.

Referring now to FIG. 1 a direct digital synthesizer 10 has an accumulator 12 that generates addresses for a memory 14. A frequency register 16 provides an index, being either an integer or fractional value, that is added to the accumulator 12 for each cycle of a clock signal from an internal clock 18. A next frequency register 20 contains an index value for a new frequency to be loaded into the frequency register 16 when a frequency change is to be implemented. A phase register 22 is preloaded with a phase jump value and coupled to the accumulator 12 via a switch 24. The switch 24 normally couples the frequency register 16 to the accumulator except for one clock cycle when a phase change is to be implemented.

A logic control circuit 26 provides an enable signal to the frequency register 16 when a frequency change, as indicated by control inputs to the logic control circuit, is desired so that on one phase of the next clock cycle the contents of the next frequency register 20 are loaded into the frequency register 16. The logic control circuit 26 also provides a switch signal to the switch 24 which causes the switch to couple the output of the phase register 22 to the accumulator 12 when a phase change is desired. The next frequency register 20 and phase register 22 are loaded by the logic control circuit 26 according to parameters contained in the control inputs, which parameters include what type of change and the register values for the change.

The present invention adds to the DDS 10 described above a feedback linear shift register counter 28 so that the frequency and phase changes can be made at the internal clock rate rather than being dependent upon external clock rates as in the prior art. The shift register 28 is loaded with an initial count by the logic control circuit 26 from a counter register 36 at the end of its count cycle as generated by the decode logic 30. The load is accomplished on the regular phase of a single internal clock cycle. At the next clock the shift register 28 shifts. The outputs of the shift stages that make up the shift register 28 are input to a decode logic circuit 30 that looks for an "end-of-count" condition. When the end-of-count condition is detected, a signal is sent to the logic control circuit 26 either to enable the frequency register 16 for loading a new index value from the next frequency register 20 during one phase of the clock cycle prior to adding to the accumulator 12, or to switch the input to the accumulator via the switch 24 to the phase register 22 so that a phase jump occurs on the next accumulator addition, or both. The end-of-count also reloads the shift register counter 28 from the counter register 36.

The shift register 28, as shown in greater detail in FIG. 2, has a plurality of single-bit shift stages 32 coupled in series On one edge of the clock cycle the data at the input of each stage 32 is clocked into that stage so that the contents of the shift register 26 are shifted simultaneously one bit to the right. The outputs from at least two of the stages 32 are input to an exclusive OR gate 34 to provide a feedback input value to the first stage of the shift register 26. The result is that after a predetermined number of clock cycles a predetermined output from the shift register occurs that is detected by the decode logic circuit. The initial count value that is preloaded into the shift register 28 from the counter register 36 is obtained from a lookup table that has a plurality of initial count values corresponding to a plurality of desired time delays since, unlike a conventional up/down counter, the count from an initial count to a final end-of-count value is not directly ascertainable. Also note that the value loaded into the shift register 28 shown in FIG. 2 has to be non-zero, since a zero value does not cause the contents of the shift register to change as the zero is constantly recirculated through the register. For example if the initial count is 1111111 for a seven stage shift register, the count progresses as follows: 0111111, 0011111, 0001111, 0000111, 0000011, 0000001, 1000000, 0100000, ..., 0000010, 1000001, etc. A shift register is used as a counter instead of a conventional counter due to the time delay between the change of the least significant bit to the change of the most significant bit in a conventional counter. The feedback propagation delay of the shift register 28 is independent of the number of stages, or length, of the shift register. Also with the proper selection of the stage 32 outputs to be fed back, counts as high as $2^{**}n-1$ can be achieved, only one count less than for a binary counter of n bits.

Thus the present invention provides a direct digital synthesizer (DDS) with a feedback shift register configured as a counter to provide switch signals to a logic controller in order to implement frequency/phase changes at the rate of the reference clock internal to the DDS. This integration of the accumulator 12 of the DDS 10 and the shift register 28 allows for the ability to change the signal characteristics from the DDS at a precise instant of time, such as for generation of spread spectrum communication signals, including direct sequence phase modulation or frequency hopping modulation.

What is claimed is:

1. A direct digital synthesizer for generating an output waveform from a digital waveform stored in a memory that is addressed by the output of an accumulator adding a programmable index value to the output of the accumulator for each cycle of a reference clock, the output waveform having selected frequency/phase characteristics according to the value of the programmable index value and the programmable index value being derived from one of two selectable index registers, further comprising means for generating from the reference clock a control signal for changing the programmable index value to effect a phase change for the output waveform by selecting the other index register within one cycle of the reference clock and selecting the first index register within the next cycle of the reference clock.

2. A direct digital synthesizer as recited in claim 1 wherein the generating means comprises:
   a linear feedback shift register configured as a counter having the reference clock as an input;
   means for loading the linear feedback shift register with an initial count; and
   means for decoding the output of the linear feedback shift register to generate the control signal after a predetermined number of cycles of the reference clock from the initial count.

3. A direct digital synthesizer as recited in claim 2 wherein the linear feedback shift register comprises:
   a plurality of single-bit shift stages coupled in series so that the output of a prior shift stage in the series is coupled to the input of the next following shift stage in the series such that for each cycle of the reference clock the value of the prior shift stage is shifted to the next following shift stage; and
   a logic circuit coupled to the outputs of at least two of the shift stages to provide an input for the first shift stage in the series, the outputs of all of the shift stages forming the output of the linear feedback shift register.

* * * * *